United States Patent
Saitou et al.

(10) Patent No.: US 9,109,348 B2
(45) Date of Patent: Aug. 18, 2015

(54) MONITOR AND WORKING VEHICLE PROVIDED WITH THE MONITOR

(71) Applicants: Tomohiro Saitou, Hiratsuka (JP); Masahiko Hosaka, Hiratsuka (JP)

(72) Inventors: Tomohiro Saitou, Hiratsuka (JP); Masahiko Hosaka, Hiratsuka (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 203 days.

(21) Appl. No.: 13/817,123

(22) PCT Filed: Oct. 18, 2012

(86) PCT No.: PCT/JP2012/076975
§ 371 (c)(1),
(2) Date: Feb. 14, 2013

(87) PCT Pub. No.: WO2014/024329
PCT Pub. Date: Feb. 13, 2014

(65) Prior Publication Data
US 2014/0240638 A1    Aug. 28, 2014

(30) Foreign Application Priority Data

Aug. 10, 2012  (JP) ................................. 2012-179007

(51) Int. Cl.
G02F 1/1333      (2006.01)
E02F 9/26        (2006.01)
G09F 9/00        (2006.01)

(52) U.S. Cl.
CPC ............ *E02F 9/26* (2013.01); *G02F 1/133308* (2013.01); *G09F 9/00* (2013.01); *G02F 2001/13332* (2013.01); *G02F 2001/133311* (2013.01)

(58) Field of Classification Search
CPC ....................... B32B 2037/246; B22F 2998/00
USPC ............................ 349/60, 58; 250/349; 438/66
See application file for complete search history.

(56) References Cited

U.S. PATENT DOCUMENTS

| | | | |
|---|---|---|---|
| 2002/0063812 A1* | 5/2002 | Natsuyama | 349/58 |
| 2009/0167980 A1* | 7/2009 | Watanabe | 349/58 |
| 2012/0127639 A1* | 5/2012 | Lai | 361/679.01 |

FOREIGN PATENT DOCUMENTS

| | | | | |
|---|---|---|---|---|
| DE | 3622458 | * | 1/1997 | ............ B60K 35/00 |
| JP | 07-199160 | * | 8/1995 | ............ G02F 1/1333 |
| JP | H07-199160 A | | 8/1995 | |
| JP | 2000-148029 A | | 5/2000 | |
| JP | 2000-156569 | * | 6/2000 | ............... H05K 5/02 |
| JP | 2000-156569 A | | 6/2000 | |
| JP | 2001-117076 A | | 4/2001 | |
| JP | 2011-117076 | * | 4/2001 | ............ G02F 1/3333 |
| JP | 2002-365613 A | | 12/2002 | |
| JP | 2011-132800 A | | 7/2011 | |

OTHER PUBLICATIONS

International Search Report mailed Jan. 22, 2013 from International Application No. PCT/JP2012/076975, 2 pages.

* cited by examiner

*Primary Examiner* — Sang V Nguyen
(74) *Attorney, Agent, or Firm* — Fish & Richardson P.C.

(57) ABSTRACT

A monitor includes a display in a form of a liquid crystal display, a rubber frame having a surrounding face that surrounds an outer circumferential surface of the liquid crystal display, and a front case having a housing that houses the liquid crystal display attached with the rubber frame. The rubber frame includes a projection that projects from a surface of the surrounding face and that is elastically deformed by contacting with an inner circumferential surface of the housing.

11 Claims, 7 Drawing Sheets

MONITOR AND WORKING VEHICLE PROVIDED WITH THE MONITOR

CROSS-REFERENCE TO RELATED APPLICATIONS

This application claims priority to International Application No. PCT/JP2012/076975 filed on Oct. 18, 2012, which application claims priority to Japanese Application No. 2012-179007, filed on Aug. 10, 2012. The contents of the above applications are incorporated herein by reference in their entireties.

TECHNICAL FIELD

The present invention relates to a monitor and a working vehicle provided with the monitor, particularly improvement in a structure of the monitor for holding a display therein.

BACKGROUND ART

As a monitor mounted in a cab of a hydraulic excavator and the like, a monitor including a liquid crystal display has been typically known (see, FIGS. 5 and 6 of Patent Literature 1). Such a monitor can display on the liquid crystal display various information such as a residual fuel amount of an engine and a battery charge amount.

Moreover, since a construction machine (e.g., a hydraulic excavator) and an industrial vehicle (e.g., a forklift) suffer a severe vibration during operation, it is required to prevent vibration of the liquid crystal display installed in an inside of the monitor and secure vibration resistance of the liquid crystal display. For this purpose, an outer circumference of the liquid crystal display is covered with a rubber frame to absorb the vibration by an elastic deformation of the rubber frame.

CITATION LIST

Patent Literature(s)

Patent Literature 1: JP-A-2011-132800

SUMMARY OF THE INVENTION

Problem(s) to be Solved by the Invention

However, the liquid crystal display whose outer circumference is covered with the rubber frame is difficult to fit in a housing provided in a case of the monitor, resulting in a poor assembly performance. In other words, when the housing, which has a depth as deep as a thickness of the liquid crystal display, houses the liquid crystal display, the rubber frame covering sides of the liquid crystal display is brought into contact with an inner circumferential surface of the housing. Accordingly, a large friction resistance is generated, so that the liquid crystal display cannot be easily fitted in the housing of the case.

Moreover, since the rubber frame and the inner circumferential surface of the housing are in surface contact with each other, in other words, in a close contact with each other without a gap therebetween, the rubber frame may become rather difficult to deform during vibration, thereby being unable to sufficiently absorb vibration. Furthermore, the construction machine and the like are generally used outside. When the construction machine and the like are used in a site where an outside air temperature largely fluctuates, an outer frame of the liquid crystal display and the housing of the case are thermally expanded or thermally shrunk. At this time, since the outer frame (metallic one) of the liquid crystal display and the housing (resin-made one) of the case are made of different materials, the outer frame and the housing are different in an expansion level and a shrinkage level because of the different materials, so that a contact pressure in a contact surface between the outer frame of the liquid crystal display and the housing of the case is expected to change according to fluctuation of the outer air temperature. For this reason, the rubber frame, which is to be interposed between the outer frame of the liquid crystal display and the housing of the case, needs to prevent damage on the outer frame of the liquid crystal display and the housing of the case by absorbing change in the contact pressure.

An object of the invention is to provide a monitor having more improved assembly performance, vibration resistance and heat resistance, and a working vehicle provided with the monitor.

Means for Solving the Problem(s)

According to a first aspect of the invention, a monitor includes: a display; a rubber frame including a surrounding face that surrounds an outer circumferential surface of the display; and a case including a housing that houses the display attached with the rubber frame, in which the rubber frame includes a projection that projects from a surface of the surrounding face and that is elastically deformed by contacting with an inner circumferential surface of the housing.

In a monitor according to a second aspect of the invention, the rubber frame includes a protruding portion that is provided continuously to the surrounding face and covers a periphery of a display screen of the display.

In a monitor according to a third aspect of the invention, a metallic framing case is provided on the display screen of the display, the framing case includes: a frame that is provided corresponding to the periphery of the display screen; an engaging piece that is formed by bending from the frame and is locked to each of sides of the display; and a bent portion that defines a border between the frame and the engaging piece, and the protruding portion of the rubber frame is provided in a range corresponding to a region closer to the bent portion in the frame of the framing case.

In a monitor according to a fourth aspect of the invention, the projection of the rubber frame is located near a reinforcing rib provided to the housing.

In a monitor according to a fifth aspect of the invention, the inner circumferential surface of the housing is inclined in a manner to expand toward an inlet of the housing that houses the display.

In a monitor according to a sixth aspect of the invention, the projection is continuously provided within a width of the surrounding face.

In a monitor according to a seventh aspect of the invention, the projection has a substantially semi-circular cross-section.

According to an eighth aspect of the invention, a monitor installed near an operator's seat of a working vehicle includes: a display provided by a liquid crystal display; a rubber frame including a surrounding face that surrounds an outer circumferential surface of the display; and a case including a housing that houses the display attached with the rubber frame, in which the rubber frame includes a projection that projects from a surface of the surrounding face and that is elastically deformed by contacting with an inner circumferential surface of the housing, a metallic framing case is provided on a display screen of the display, the framing case includes: a frame that is provided corresponding to the periphery of the display screen; an engaging piece that is formed by bending from the frame and is locked to each of sides of the display; and a bent portion that defines a border between the frame and the engaging piece, and the protruding portion of the rubber frame is provided in a range corresponding to a region closer to the bent portion in the frame of the framing case.

According to a ninth aspect of the invention, a working vehicle includes the monitor according to the first to eighth aspects of the invention.

Herein, the working vehicle refers to a vehicle conceptually including a construction machine such as a hydraulic excavator and a wheel loader and an industrial vehicle such as a forklift. The same applies to the working vehicle in the eighth aspect of the invention.

According to the first and ninth aspects of the invention, since the projection that projects from the surface of the surrounding face and that is elastically deformed by contacting with the inner circumferential surface of the housing is provided on the surface of the surrounding face of the rubber frame attached to a liquid crystal display, the surface of the surrounding face is not entirely in contact with the inner circumferential surface, so that friction resistance offered when the display is housed into the housing can be reduced to facilitate an assembly operation. Moreover, by elastic deformation of the projection, vibration of the liquid crystal display and a difference in thermal expansion between the liquid crystal display and the case can be favorably absorbed to improve vibration strength and heat resistance.

According to the second aspect of the invention, since the rubber frame includes the protruding portion that covers the periphery of the display screen of the display, a framing case usually used on the periphery of the display can also be hidden to improve design.

According to the third aspect of the invention, the metallic framing case is provided on the display. In such a framing case, a bent portion that defines a border between the frame and the engaging piece exhibits a largest rigidity. Accordingly, by facing the region closer to the bent portion of the frame and the protruding portion of the rubber frame to each other, while the protruding portion is interposed between the display and the case, a pressing force for holding the display is transmitted to the case through the bent portion having a large rigidity, so that the display can be held by a large pressing force while deformation of the framing case by the pressing force can be prevented.

According to the fourth aspect of the invention, since the projection of the rubber frame is located near a reinforcing rib provided to the housing, the pressing force to be transmitted to the housing through the projection is reliably receivable by the reinforcing rib, so that the housing can be prevented from being deformed in a manner to expand outward.

According to the fifth aspect of the invention, the inner circumferential surface of the housing is expanded, and the housing is wide at the inlet thereof and becomes narrower toward the inner most thereof. Accordingly, when the liquid crystal display attached with the rubber frame is housed into the housing, the liquid crystal display can be smoothly housed at an early stage to facilitate an assembly operation, and the projection is reliably collapsed at the completion of housing to provide a favorable holding force.

According to the sixth aspect of the invention, since the projection is continuously provided within a width of the surrounding face, the sides of the display can be favorably held to reliably absorb the vibration and the difference in thermal expansion.

According to the seventh aspect of the invention, since the projection has a substantially semi-circular cross-section, an elastic force offered when the projection starts to be elastically deformed from a tip end thereof can be gradually exhibited, thereby avoiding such a disadvantage as a friction force between the projection and the inner circumferential surface of the housing abruptly becomes large during housing of the liquid crystal display into the housing to cause the surrounding face to be turned up.

According to the eighth aspect of the invention, the advantages of the first to third aspects of the invention can be simultaneously obtained.

DESCRIPTION OF EMBODIMENT(S)

An exemplary embodiment of the invention will be described below with reference to attached drawings.

Figure 1:
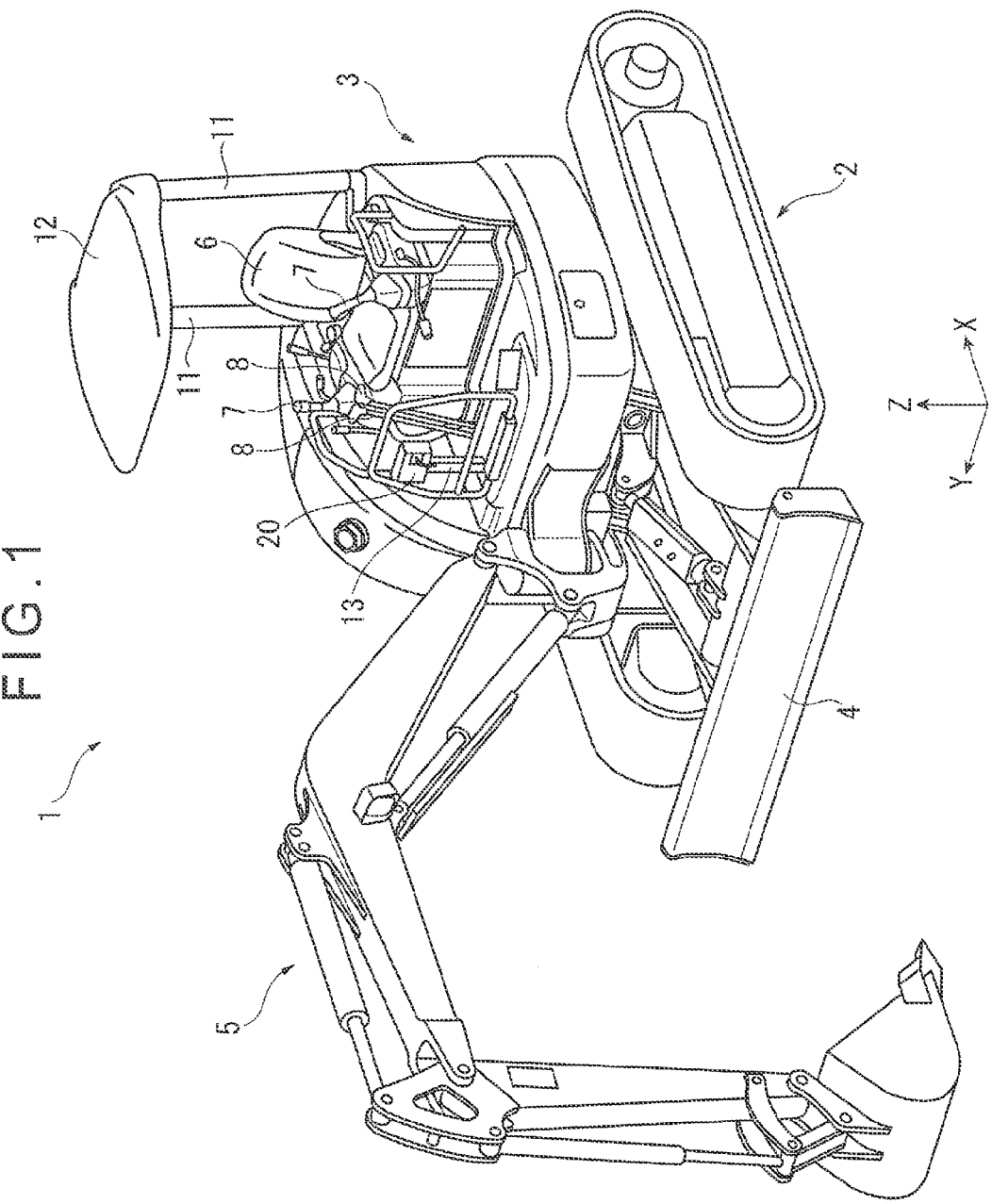
FIG. 1 is a perspective view showing a hydraulic excavator (i.e., a working vehicle) according to an exemplary embodiment of the invention.
Figure 2:
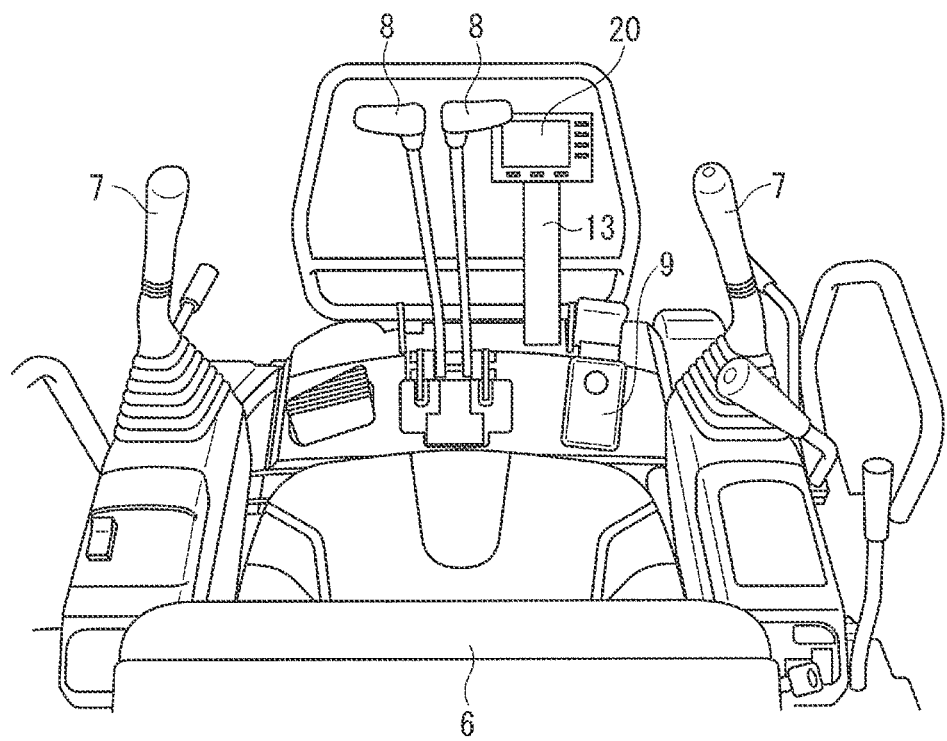
FIG. 2 illustrates the hydraulic excavator as viewed from an operator's seat facing forward.

FIG. 1 is a perspective view of an entirety of a small-sized hydraulic excavator 1 serving as a working vehicle according to the exemplary embodiment. FIG. 2 illustrates the hydraulic excavator 1 as viewed from an operator's seat 6 facing forward.

In FIGS. 1 and 2, the hydraulic excavator 1 is provided with a crawler undercarriage 2, an upper revolving body 3 rotatably mounted on the undercarriage 2, a blade 4 that is provided in front of the undercarriage 2 and is liftable by a hydraulic actuator, and working equipment 5 that is provided in front of the upper revolving body 3. Since the working equipment 5 is well-known one in which a boom, an arm and a bucket are individually driven by a hydraulic actuator, a detailed description of the working equipment 5 will be omitted.

The upper revolving body 3 is provided with control levers 7,7 on the right and left of the operator's seat 6, traveling levers 8,8 on a front side of a floor, a control pedal 9 for swinging the boom, and the like. The hydraulic excavator 1 in this exemplary embodiment is designed to have a canopy, including a roof 12 supported by two columns 11 standing on the upper revolving body 3 above the operator's seat 6. Further, in the hydraulic excavator 1, a monitor 20 supported by a support frame 13 standing on the floor is provided next to the traveling levers 8. A position of the monitor 20 as shown in FIG. 2 is one example. The monitor 20 may be positioned in a console on the right of the operator's seat 6.

The monitor 20 will be described in details with reference to FIG. 3. The monitor 20 includes a display in a form of a liquid crystal display. Display contents of the liquid crystal display are switchable by operating a plurality of control buttons. Examples of the display contents include a service meter, an engine water temperature gauge, an engine fuel gauge, a preheat monitor, an engine hydraulic monitor, a driving acceleration monitor, an electric system alarm monitor, a fuelometer and a current time. The monitor 20 may be provided by a touch panel in which a plurality of control switches are installed on the liquid crystal display to integrate a display function and an operation function. The display may be provided by an organic electroluminescent display in place of the liquid crystal display.

Figure 3:
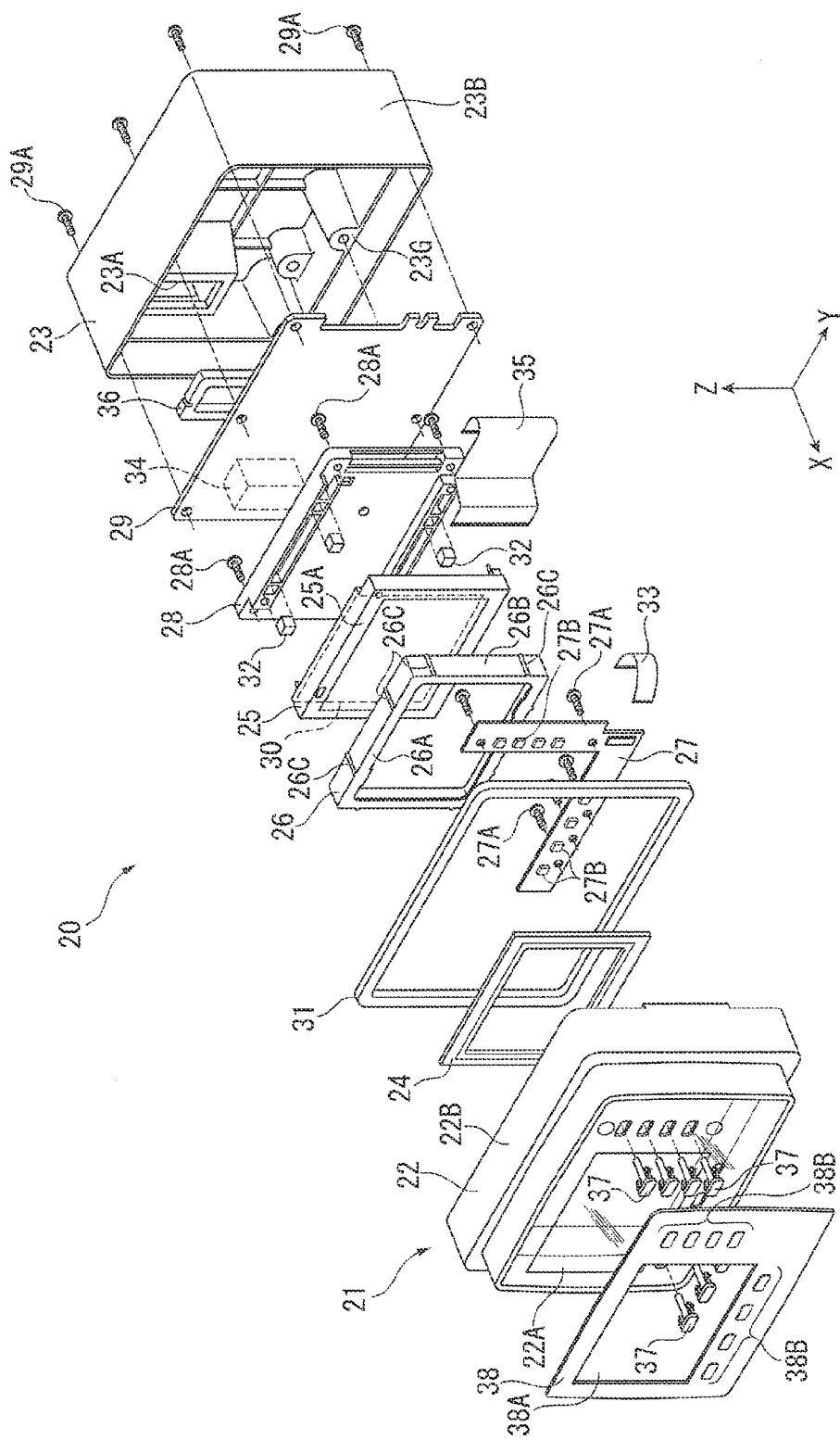
FIG. 3 is an exploded perspective view showing a monitor mounted in the hydraulic excavator.

FIG. 3 is an exploded perspective view showing the monitor 20.

In FIG. 3, the monitor 20 includes an exterior case 21 including a front case 22 and a rear case 23, both of which are shaped in a bottomed box. The front case 22 is formed in a two-color molding with a front face 22A made of a transparent acrylic resin and a side face 22B made of a black AES (acrylonitrile/ethylene-propylene-diene/styrene) resin. The rear case 23 is entirely molded by a black ABS (acrylonitrile-butadiene-styrene) resin. Note that the front case 22 and the rear case 23 may be provided in other colors instead of black. The AES resin is superior to the ABS resin in weather resistance. Accordingly, in the monitor mounted in the working vehicle and exposed outside as in the exemplary embodiment, the AES resin is preferably applied to the front case of the monitor.

A rectangular housing 50 (FIGS. 4, 5 and 6) is provided at a back of the transparent front face 22A of the front case 22. A liquid crystal display 25 is housed in the housing 50 through a resin frame 24 shaped in a thin plate. At this time, a metallic framing case 25A forming an outer circumference of the liquid crystal display 25 is fitted in an elastic rubber frame 26. The rubber frame 26 absorbs vibration applied on the liquid crystal display 25, thereby securing durability of the liquid crystal display 25. At the same time, the rubber frame 26 absorbs a difference in thermal expansion between the resin-made front case 22 and the metallic framing case 25A, thereby preventing breakage of the front case 22 or the liquid crystal display 25. Details of the rubber frame 26 will be described later.

In the assembled monitor 20, a display surface 38A of the liquid crystal display 25 (a display surface of a finisher sheet 38) and a control button 38B (a part of the finisher sheet 38 covering a knob switch 37) are substantially coplanar. An L-shaped switch substrate 27 is provided surrounding the liquid crystal display 25 (as shown in FIG. 3, in a positive direction of a Y axis and in a negative direction of a Z axis viewed from the liquid crystal display 25). Moreover, control buttons are provided to form an L shape around the display surface 38A (see FIG. 3). In the exemplary embodiment (FIG. 3), for instance, four control buttons are vertically provided while four control buttons are horizontally provided. However, the number of the control buttons may depend on the function of the monitor 20. A switch 27B (a tact switch) is mounted on the switch substrate 27 in a manner to correspond to the location and the number of the control buttons. When any control button 38B on an operation surface is pressed, the knob switch 37 is displaced in the negative direction of the X axis shown in FIG. 3, whereby a tip end of the knob switch 37 presses a surface of the switch 27B mounted on the switch substrate 27, so that the switch 27B generates an electric signal. The electric signal is transmitted to the monitor substrate 29. For instance, when the control button is operated for causing a screen transition of the liquid crystal display 25 to a predetermined screen, a control signal for the screen transition is transmitted from the monitor substrate 29 to a driving-circuit substrate (not shown) integrally installed with the liquid crystal display 25.

The switch substrate 27 is screwed by screws 27A on a plurality of mounting bosses 27C (FIG. 5) that are integrally formed with the front face 22A and project toward the rear case 23. A plurality of mounting bosses 28B similarly formed (FIG. 5) are provided on the front face 22A. A resin-made holder 28 is screwed by screws 28A on the mounting bosses 28B. Four rubber pressing members 32 are respectively attached at separate positions of the top, the bottom, the right and the left of a front surface of the holder 28 (in the positive direction of the X axis shown in FIG. 3). The holder 28, once attached on the mounting bosses 28B, presses the liquid crystal display 25 from the back thereof (in the negative direction of the X axis shown in FIG. 3) through the pressing member 32, thereby holding the liquid crystal display 25 in order to avoid displacement of the liquid crystal display 25 within the housing 50.

Mounting bosses 29B (FIG. 5) are formed at four corners and another part of the front face 22A. A monitor substrate 29 in which a power supply circuit and a control circuit for the liquid crystal display 25 are formed is placed on the mounting bosses 29B. The holder 28 and the monitor substrate 29 are disposed in a manner to separate from each other with a predetermined interval (at an interval separated in the X direction shown in FIG. 3). The above-described components are housed in the front case 22, into which the rear case 23 is fitted through a gasket 31 formed of urethane for attachment. The rear case 23 is screwed for attachment by screws 29A to the mounting bosses 29B on which the monitor substrate 29 is placed. In other words, the monitor substrate 29 and the rear case 23 are tightened together and attached while being held between the mounting bosses 29B and a screw insert portion 23G of the rear case 23 (FIG. 3).

Moreover, the switch substrate 27 and the monitor substrate 29 are electrically connected to each other through a flat cable 33. The monitor substrate 29 and a drive substrate 30 for a drive circuit (FIG. 5) which is integrally formed with the liquid crystal display 25 are also connected to each other through a flat cable 35. The drive substrate 30 receives the control signal from the monitor substrate 29 and controls which color is to be displayed on the liquid crystal display 25.

On the back (in the negative direction of the X axis in FIG. 3) of the monitor substrate 29, a connector (a socket) 34, to which an exterior cable for power supply and signal communication is connected, is installed. The connector 34 is exposed outside through an opening 23A provided on the rear case 23. A gasket 36 formed of urethane is attached around the opening 23A in the rear case 23 to seal a gap generated between the opening 23A and the connector 34. As described above, the monitor 20 has an airproof structure to avoid water and dust from entering an inside of the monitor 20 from the outside.

On the other hand, on the front face 22A of the front case 22, a plurality of cylindrical insert portions 37A (FIG. 5) project toward the rear case 23. The knob switch 37 is inserted into each of the insert portions 37A from the front. At the tip end of the knob switch 37, the switch 27B installed in the switch substrate 27 is positioned. Pressing the knob switch 37 through the finisher sheet 38 thereon as described above enables the switch 27B to be operated and the display contents of the liquid crystal display 25 to be switched. When the touch panel is used as described above, since the functions of the knob switch 37 and the switch 27B are installed on the touch panel, the knob switch 37 becomes unnecessary. However, the monitor 20 may be provided by a combination of the touch panel, the knob switch 37 and the switch 27B by providing no function to the touch panel while uniquely providing a specific function to the knob switch 37.

The resin-made finisher sheet 38 is attached on the front face 22A in a manner to cover even the knob switch 37.

As shown in FIG. 3, among the above-described components, the components from the resin frame 24 to the monitor substrate 29 are contained in the front case 22 while only the connector 34 installed on the monitor substrate 29 protrudes beyond the front case 22 in the negative direction of the X axis (toward the rear case 23) shown in FIG. 3. Accordingly, in the assembled monitor 20, the rear case 23 has an inner space of a large capacity therein. In the inner space, only the connector 34 is located and most of the inner space is kept unoccupied. In other words, the large inner space of the rear case 23 is created by intentionally enlarging a surface area of the surface portion 23B of the rear case 23. By enlarging the surface area of the surface portion 23B, heat generated from the monitor substrate 29 and the liquid crystal display 25 is efficiently radiated outward through the surface portion 23B. Due to the large inner space of the rear case 23, the monitor 20 is enlarged in size in the X direction of FIG. 3. Since an operator's eye direction is the X direction during operations such as digging using a working vehicle, unless the monitor 20 is enlarged in the Y direction or the Z direction of FIG. 3, an operator's view during operations is not disturbed, so that operability is not affected.

Figure 4:
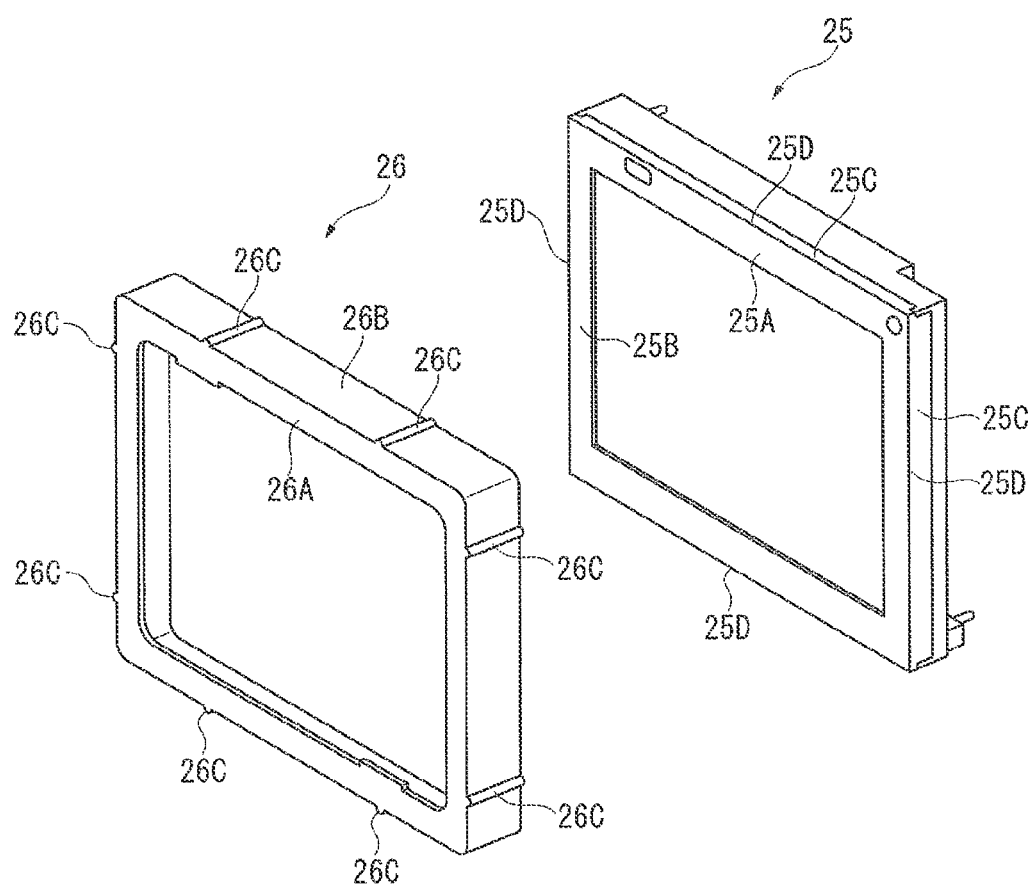
FIG. 4 is a perspective view showing a liquid crystal display and a rubber frame.

FIG. 4 is a perspective view showing the liquid crystal display 25 and the rubber frame 26. In FIG. 4, the metallic framing case 25A is provided in front of the liquid crystal display 25. The framing case 25A is produced by press working and the like in which a metal plate (e.g., a galvanized steel plate) is punched and then bent. The framing case 25A includes: a frame 25B that corresponds to a periphery of a display surface (i.e., a front) of the liquid crystal display 25; an engaging piece 25C that is formed by bending from the frame 25B and is locked to each of sides of the liquid crystal display 25; and a bent portion 25D that is a bent portion between the frame 25B and the engaging piece 25C.

The rubber frame 26 includes: a protruding portion 26A that covers the periphery of the display surface of the liquid crystal display 25 in a manner to be placed on the frame 25B of the framing case 25A; and a surrounding face 26B that is integrally formed with the protruding portion 26A and surrounds an outer circumferential surface (four sides) of the liquid crystal display 25. Although a material for the rubber frame 26 is not limited to a specific one, nitrile rubber is used in the exemplary embodiment. In addition, an elastically deformable material (e.g., silicone rubber) generally used as an industrial product is applicable.

On each surface of sides of the surrounding face 26B, two projections 26C are provided spaced apart from each other while extending along a housing direction of the liquid crystal display 25 into the housing 50. The housing direction is the same direction as the direction (the X direction of FIG. 3) in which the rubber frame 26 is attached to the liquid crystal display 25. Each of the projections 26C has the same length as a width of the surrounding face 26B. The projections 26C are continuously provided within the width of the surrounding face 26B.

Figure 5:
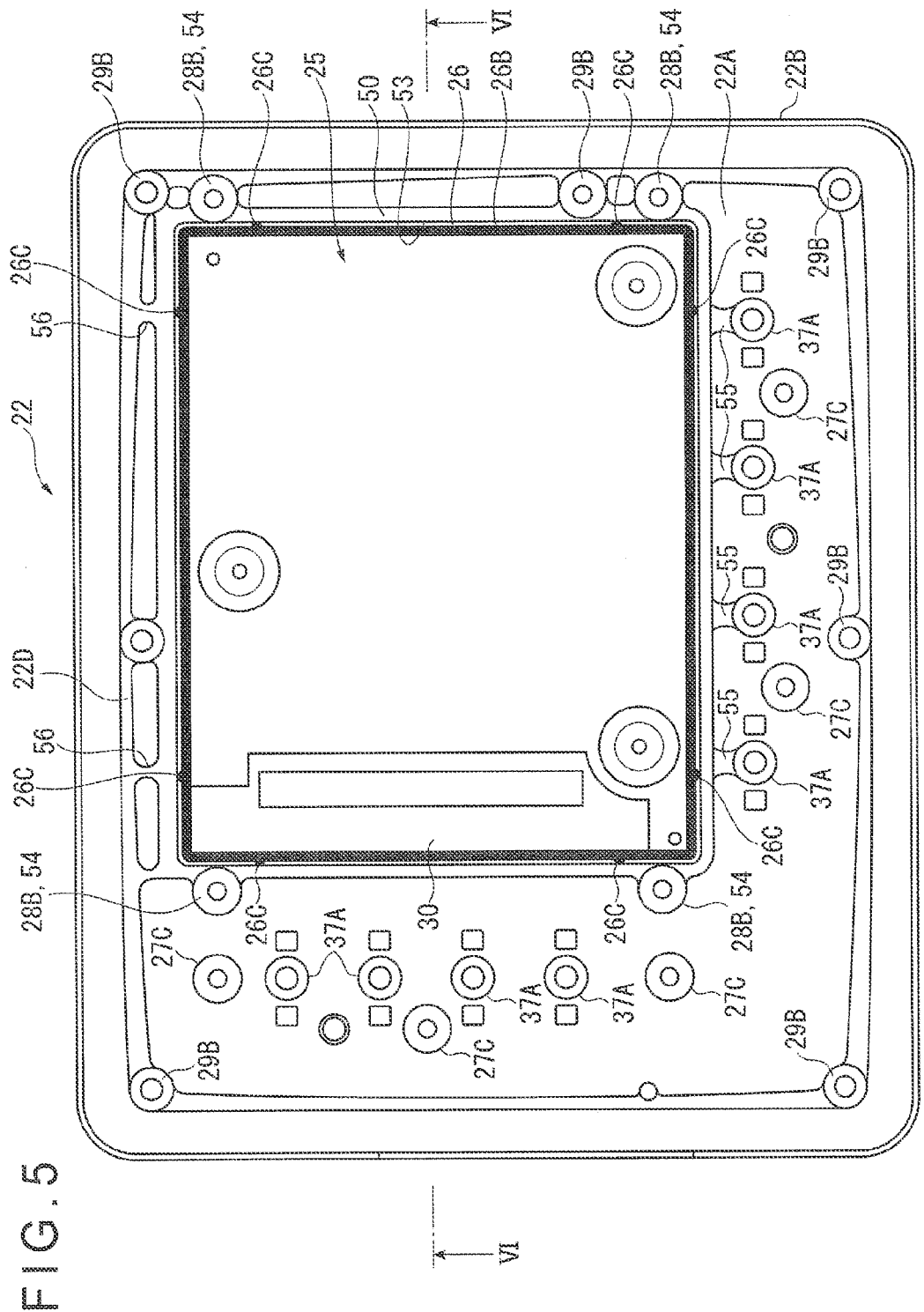
FIG. 5 is a plan view showing the liquid crystal display housed in a housing.

FIG. 5 shows the housing 50 housing the liquid crystal display 25 attached with the rubber frame 26. In this state, the projection 26C is in contact with an inner circumferential surface 53 of the housing 50 while a contact portion of the projection 26C with the inner circumferential surface 53 being crushed. The inner circumferential surface 53 is not in contact with a surface of the surrounding face 26B (a surface except for the projection 26C). Specifically, the rubber frame 26 and the inner circumferential surface 53 of the housing 50 are in contact with each other through eight projections 26C. When the liquid crystal display 25 attached with the rubber frame 26 is housed into the housing 50, the projections 26C and the inner circumferential surface 53 are in contact with each other by the minimum contact area, so that the liquid crystal display 25 can be smoothly housed into the housing 50. In other words, use of such a rubber frame 26 leads to a significant reduction of friction resistance when the liquid crystal display 25 attached with the rubber frame 26 is housed into the housing 50, which provides an excellent assembly performance.

The liquid crystal display 25 is housed in the housing 50 and assembled into the monitor 20. The monitor 20 is installed in the hydraulic excavator 1. Even when the monitor 20 receives vibration from the outside thereof, since the projections 26C are formed of an elastic material, vibration received by the liquid crystal display 25 in the housing 50 is absorbable by the entire rubber frame 2, so that vibration resistance of the monitor 20 can be secured. On the other hand, according to fluctuation of the outside air temperature, for instance, the framing case 25A of the liquid crystal display 25 differs from the housing 50 in a level of thermal expansion or thermal shrinkage, which is caused by a difference in the material therebetween. In other words, a contact force between the framing case 25A of the liquid crystal display 25 and the inner circumferential surface 53 of the housing 50 is changed by heat. However, when the projections 26C are elastically deformed according to change in the contact force, the projections 26C can absorb the contact force, even if changed, to prevent damage to the liquid crystal display 25 and the housing 50 of the front case 22.

The mounting bosses 28B for attaching the holder 28 are provided near both shorter sides of the rectangular housing 50 in a plan view. The mounting bosses 28B also function as ribs 54 for reinforcing the housing 50 from the outside thereof. Further, ribs 55 are provided between one of longer sides of the housing 50 and the plurality of insert portions 37A through which the knob switches 37 are inserted. The ribs 55 reinforce the housing 50. A rib 56 is provided between the other of the longer sides and its facing wall 22D. The rib 56 reinforces the housing 50. The projections 26C of the rubber frame 26 are provided near the ribs 54 to 56 in a manner to correspond thereto. Since the projections 26C are provided near the ribs 54 to 56, a pressing force to be transmitted to the housing 50 through the projections 26C is reliably receivable by the ribs 54 to 56, so that the housing 50 can be prevented from being deformed in a manner to expand outward.

Figure 6:
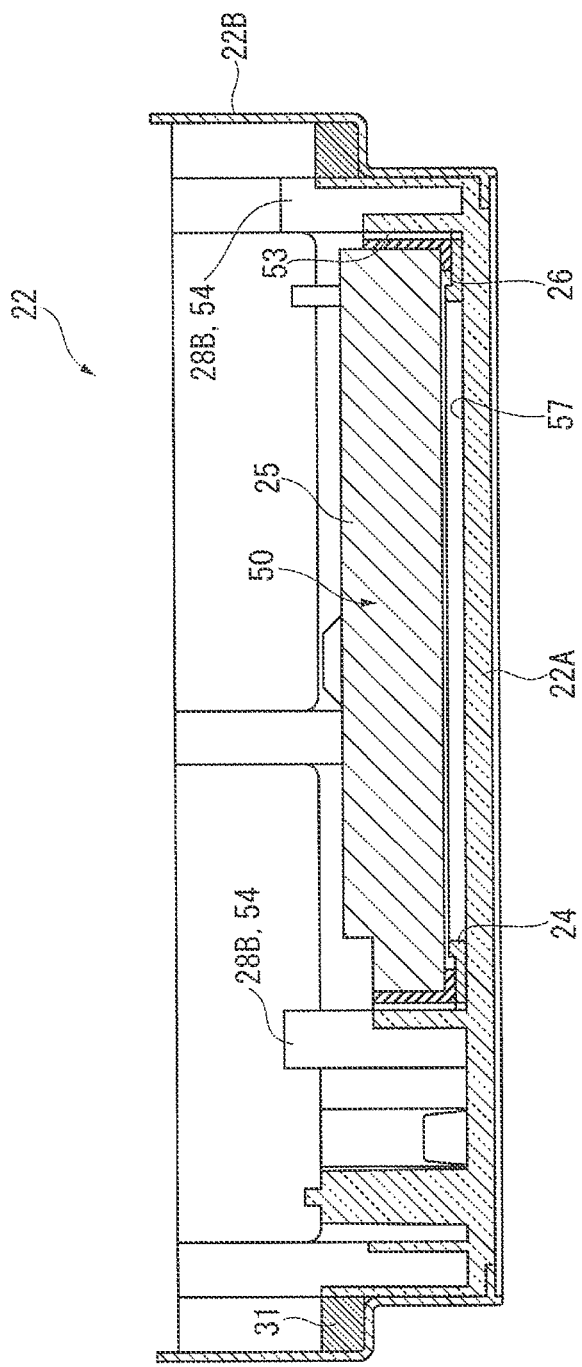
FIG. 6 is a cross-sectional view taken along a line VI-VI in FIG. 5 that is a plan view showing the liquid crystal display housed in the housing.
Figure 7:
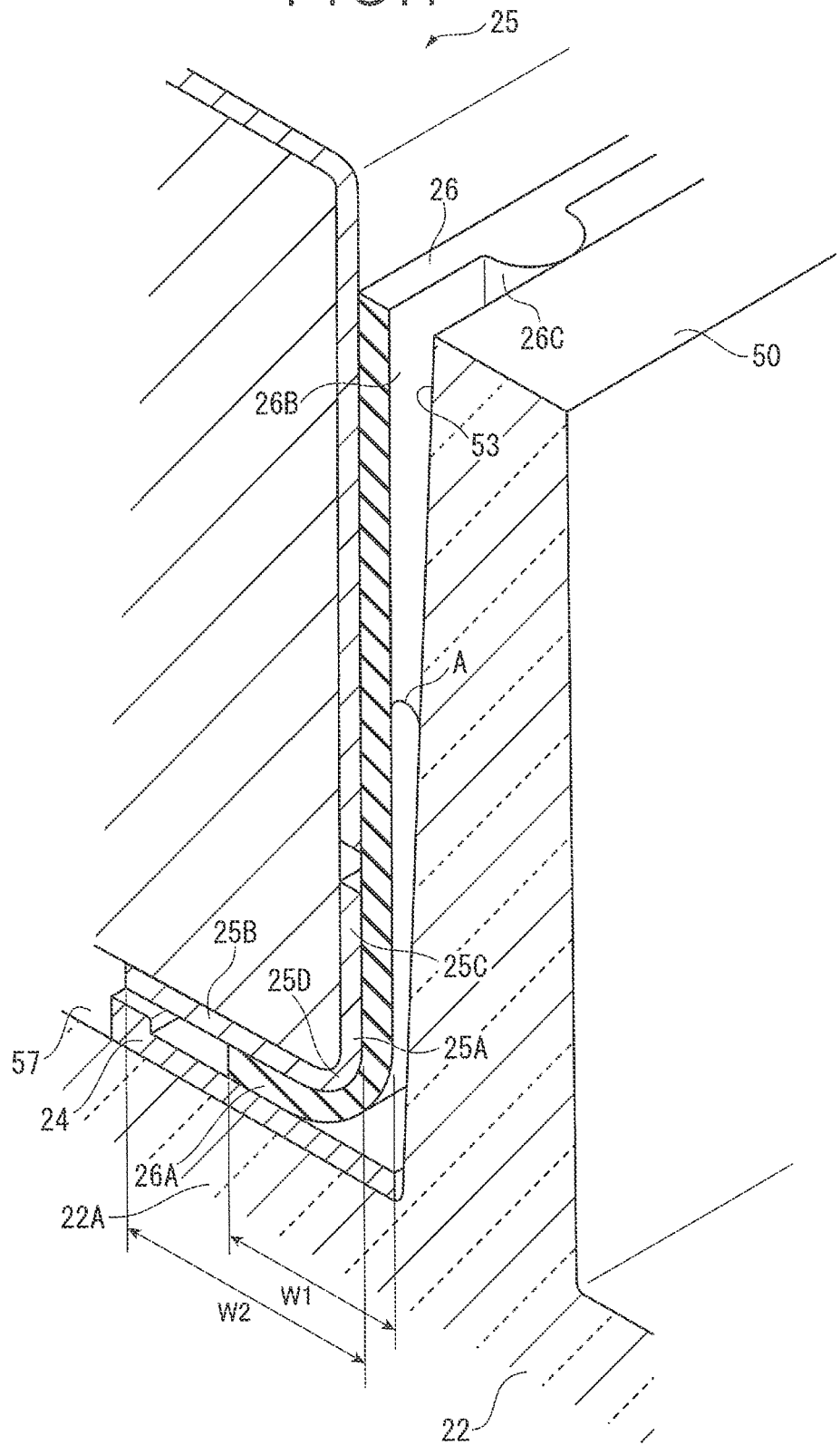
FIG. 7 is a cross-sectional perspective view showing an enlarged relevant part of FIG. 6.

FIG. 6 is a cross-sectional view taken along the line VI-VI in FIG. 5 that is a plan view showing the liquid crystal display 25 housed in the housing. FIG. 7 is a cross-sectional perspective view showing an enlarged relevant part of FIG. 6. As shown in FIGS. 6 and 7, the resin frame 24 is placed on an inner surface 57 of the front face 22A in the housing 50. The entire protruding portion 26A of the rubber frame 26 is in close contact with a back of the resin frame 24. The resin frame 24 functions as a cushioning material. Since the resin frame 24 is provided so as to hide the framing case 25A of the liquid crystal display 25, the framing case 25A is difficult to see from the outside of the monitor 20, thereby improving design. The protruding portion 26A of the rubber frame 26 has a width W1 significantly smaller than a width W2 of the frame 25B of the framing case 25A (approximately W2=2× W1 in the exemplary embodiment). Consequently, the protruding portion 26A is provided in a range corresponding to a region closer to the bent portion 25D that is a border between the frame 25B of the framing case 25A and the engaging piece 25C. The protruding portion 26A is interposed between the region of the frame 25B closer to the bent portion 25D and the resin frame 24.

The framing case 25A manufactured by bending the metal plate has the maximum rigidity at the bent portion 25D. Accordingly, since the width W1 of the protruding portion 26A is determined in the range corresponding to the region closer to the bent portion 25D, even when the pressing force for housing the liquid crystal display 25 in the housing 50 for assembly is transmitted from the liquid crystal display 25 to the front face 22A via the rubber frame 26 and the resin frame 24, the pressing force is received at a highly rigid portion of the framing case 25A. Accordingly, the monitor 20 in which deformation of the framing case 25A is preventable and the liquid crystal display 25 is reliably held in the front case 22 by a larger pressing force is achievable. Even if fluctuation of the outside air temperature causes thermal expansion of each of the components, thereby increasing the pressing force, since the range of the protruding portion 26A is determined as described above, the pressing force acts on the highly rigid portion of the framing case 25A. Consequently, deformation or the like of the framing case 25A is preventable even in fluctuation of the outside air temperature.

As shown in an enlarged manner in FIG. 7, the projection 26C of the rubber frame 26 is substantially semi-circular in cross-section (an end surface of the projection 26C is also the same as the cross-section). The inner circumferential surface 53 of the housing 50 has an inclination (i.e., A shown in FIG. 7) in a manner to expand toward the back (an upper side of the drawing). With this arrangement, the cross-sectionally semi-circular projection 26C is significantly elastically deformed to be cross-sectionally collapsed near the front face 22A (i.e., near the inner most of the housing 50), while the projection 26C is nearly in line contact with the housing 50 near an inlet thereof (an upper side of the drawing), so that an elastically deformed amount of the projection 26C is small.

For this reason, when the liquid crystal display 25 attached with the rubber frame 26 is housed into the housing 50 for assembly, during an initial process to push the liquid crystal display 25 into the housing 50, the deformed amount of the projection 26C of the rubber frame 26 is small, so that the liquid crystal display 25 can be smoothly housed. As the process to push the liquid crystal display 25 attached with the rubber frame 26 into the housing 50 further proceeds, an opening area near the inner most of the housing 50 becomes narrower. Accordingly, while the liquid crystal display 25 attached with the rubber frame 26 is finally housed in the housing 50, a predetermined contact force is applied on a contact surface between the projection 26C and the inner circumferential surface 53 of the housing 50, so that the liquid crystal display 25 is securely held. Note that a taper angle of the inclination (A) of the inner circumferential surface 53 is larger than an angle given as a draft to a die for resin-molding the front case 22 and is intentionally given for differentiating the elastically deformed amount of the projection 26C along the housing direction as described above.

Incidentally, the invention is not limited to the above-described exemplary embodiment, but includes modifications and improvements as long as the objects of the invention can be achieved.

Although the exemplary embodiment describes that the monitor of the invention is exemplarily installed in the hydraulic excavator 1 as a working vehicle, the monitor of the invention may be installed in a working vehicle such as other construction machines (e.g., a wheel loader) and industrial vehicles (e.g., a forklift). In the case of the forklift, display contents peculiar to the forklift may be displayed. Examples of the display contents include directions in which a fork claw is lifted and lowered, a load applied on the fork claw, a load applied on a travelling wheel and a travelling speed. In the case of a battery-powered forklift, a battery charge amount, electric power consumption and the like may be displayed.

In the exemplary embodiment, although the projection 26C of the rubber frame 26 is continuously formed in the same length as the width of the surrounding face 26B, the length may be shorter than the width, for instance, half of the width or less. In such a case, providing the projection 26C closer to the protruding portion 26A can secure a sufficient holding force of the liquid crystal display 25 in the housing 50. Alternatively, the projection 26C may be provided in a form of projections discontinuously formed within the width of the surrounding face 26B and aligned with a space apart from each other, or may be provided in a form of dots dispersively arranged. Further, the cross-section of the projection 26C is not limited to semi-circular one, but may be cross-sectionally trapezoidal, cross-sectionally triangular or cross-sectionally quadrangular. In short, the number and the shape of the projection of the invention may be determined as needed in implementing the invention.

The invention claimed is:
1. A monitor comprising:
   a display;
   a rubber frame comprising a surrounding face that is configured to surround an outer circumferential surface of the display; and
   a case comprising a housing, the housing being configured to receive and house the display that is fitted with the rubber frame,
   wherein the rubber frame comprises a projection that projects from a surface of the surrounding face and that is configured to be elastically deformed based on being contacted by an inner circumferential surface of the housing that faces the projection, and
   wherein an outer side of the housing that is opposite the inner circumferential surface of the housing includes one or more reinforcing ribs, the one or more reinforcing ribs being configured to receive the pressing force transmitted by the corresponding projection for preventing the housing from deforming.
2. The monitor according to claim 1, wherein
   the rubber frame comprises a protruding portion that is continuous with the surrounding face and that covers a periphery of a display screen of the display.
3. The monitor according to claim 2, further comprising a metallic framing case that is provided on the display screen of the display, the framing case comprising:
   a frame that is provided corresponding to the periphery of the display screen;
   an engaging piece that is formed by bending from the frame and is locked to each of sides of the display; and
   a bent portion that defines a border between the frame and the engaging piece,
   wherein the protruding portion of the rubber frame is provided in a range corresponding to a region closer to the bent portion in the frame of the framing case.
4. The monitor according to claim 1, wherein
   the inner circumferential surface of the housing is inclined in an expanding manner toward an inlet of the housing that is configured to receive the display.
5. The monitor according to claim 1, wherein
   the projection is continuously provided within a width of the surrounding face.

6. The monitor according to claim 1, wherein the projection has a substantially semi-circular cross-section.

7. A monitor installed near an operator's seat of a working vehicle, the monitor comprising:
- a display provided by a liquid crystal display;
- a rubber frame comprising a surrounding face that is configured to surround an outer circumferential surface of the display; and
- a case comprising a housing, the housing being configured to receive and house the display that is fitted with the rubber frame, wherein the rubber frame comprises:
- a projection that projects from a surface of the surrounding face and that is configured to be elastically deformed based on being contacted by an inner circumferential surface of the housing that faces the projection, and
- a protruding portion that is continuous with the surrounding face, the protruding portion covering a periphery of a display screen of the display, wherein an outer side of the housing that is opposite the inner circumferential surface of the housing includes one or more reinforcing ribs, the one or more reinforcing ribs being configured to receive the pressing force transmitted by the corresponding projection for preventing the housing from deforming, wherein a metallic framing case is provided on the display screen of the display, the framing case comprising:
- a frame that is provided corresponding to the periphery of the display screen,
- an engaging piece that is formed by bending from the frame and is locked to each of sides of the display, and
- a bent portion that defines a border between the frame and the engaging piece, and wherein the protruding portion of the rubber frame is provided in a range corresponding to a region closer to the bent portion in the frame of the framing case.

8. A working vehicle comprising the monitor according to claim 1.

9. A working vehicle comprising the monitor according to claim 7.

10. The monitor according to claim 1, wherein the one or more reinforcing ribs are configured to receive an outward pressing force that is transmitted to the housing from the projection of the rubber frame to thereby prevent the housing from expanding outward.

11. The monitor according to claim 7, wherein the one or more reinforcing ribs are configured to receive an outward pressing force that is transmitted to the housing from the projection of the rubber frame to thereby prevent the housing from expanding outward.

* * * * *